United States Patent
Frank et al.

(10) Patent No.: US 6,878,477 B2
(45) Date of Patent: Apr. 12, 2005

(54) FUEL CELL FLOW FIELD PLATE

(75) Inventors: David Frank, Scarborough (CA); Xuesong Chen, Brampton (CA); Sonia Sorbera, Mississauga (CA); Nathaniel Ian Joos, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 91 days.

(21) Appl. No.: 10/109,002

(22) Filed: Mar. 29, 2002

(65) Prior Publication Data

US 2003/0186106 A1 Oct. 2, 2003

Related U.S. Application Data

(63) Continuation-in-part of application No. 09/855,018, filed on May 15, 2001.

(51) Int. Cl.[7] ............................. H01M 2/02; H01M 2/14
(52) U.S. Cl. .............................. 429/34; 429/38; 429/39
(58) Field of Search .............................. 429/34, 38, 39, 429/26

(56) References Cited

U.S. PATENT DOCUMENTS

| | | | |
|---|---|---|---|
| 3,801,374 A | | 4/1974 | Dews et al. |
| 4,214,969 A | | 7/1980 | Lawrence |
| 4,988,583 A | | 1/1991 | Watkins et al. |
| 5,252,410 A | | 10/1993 | Wilkinson et al. |
| 5,419,980 A | | 5/1995 | Okamoto et al. |
| 5,578,388 A | | 11/1996 | Faita et al. |
| 5,789,094 A | | 8/1998 | Kusunoki et al. |
| 6,017,648 A | * | 1/2000 | Jones ............ 429/35 |
| 6,066,409 A | | 5/2000 | Ronne et al. |
| 6,080,503 A | | 6/2000 | Schmid et al. |
| 6,099,984 A | | 8/2000 | Rock |
| 6,207,312 B1 | | 3/2001 | Wynne et al. |
| 6,255,011 B1 | | 7/2001 | Fujii et al. |
| 6,309,773 B1 | | 10/2001 | Rock |
| 6,566,001 B2 | | 5/2003 | Yosida et al. |
| 2002/0172852 A1 | * | 11/2002 | Frank et al. ............ 429/34 |

FOREIGN PATENT DOCUMENTS

| | | |
|---|---|---|
| DE | 10126723 A1 | 12/2002 |
| EP | 0425939 A1 | 5/1991 |
| EP | 1156546 | 7/1998 |
| EP | 0 834 947 A1 | 8/1998 |
| JP | 05-109415 | 4/1993 |
| JP | 07-240218 | 9/1995 |
| JP | 07-263003 | 10/1995 |
| WO | WO 99/04446 | 1/1999 |
| WO | WO 00/24066 | 4/2000 |

* cited by examiner

*Primary Examiner*—Raymond Alejandro
(74) *Attorney, Agent, or Firm*—Bereskin & Parr

(57) ABSTRACT

A fuel cell stack comprising a plurality of fuel cells, each having an anode flow field plate, a cathode flow field plate and a membrane electrode assembly disposed between the flow field plates. The anode and cathode flow field plates have primary channels and ribs separating the primary channels. At least a portion of the anode and cathode primary channels are disposed directly opposite one another with a membrane exchange assembly therebetween and with at least some of the ribs on the anode and cathode flow field plates located directly opposite one another to sandwich the membrane exchange assembly therebetween. The flow field plates can also have inlet distribution and outlet collection channels. Each of these distribution and collection channels is connected to a plurality of the primary channels, preferably located centrally, so as to improve flow distribution of the reactants.

28 Claims, 11 Drawing Sheets

FUEL CELL FLOW FIELD PLATE

RELATED APPLICATIONS

This application is a continuation in part of U.S. patent application Ser. No. 09/855,018, filed May 15, 2001.

FIELD OF THE INVENTION

The present invention relates to fuel cells. More particularly, the present invention relates to configuration of fuel cell flow field plates.

BACKGROUND OF THE INVENTION

Fuel cells have been proposed as a clean, efficient and environmentally friendly source of power which can be utilized for various applications. A fuel cell is an electrochemical device that produces an electromotive force by bringing the fuel (typically hydrogen) and an oxidant (typically air) into contact with two suitable electrodes and an electrolyte. A fuel, such as hydrogen gas, for example, is introduced at a first electrode, i.e. anode where it reacts electrochemically in the presence of the electrolyte to produce electrons and cations. The electrons are conducted from the anode to a second electrode, i.e. cathode through an electrical circuit connected between the electrodes. Cations pass through the electrolyte to the cathode. Simultaneously, an oxidant, such as oxygen gas or air is introduced to the cathode where the oxidant reacts electrochemically in the presence of the electrolyte and catalyst, producing anions and consuming the electrons circulated through the electrical circuit; the cations are consumed at the second electrode. The anions formed at the second electrode or cathode react with the cations to form a reaction product. The anode may alternatively be referred to as a fuel or oxidizing electrode, and the cathode may alternatively be referred to as an oxidant or reducing electrode. The half-cell reactions at the two electrodes are, respectively, as follows:

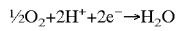

The external electrical circuit withdraws electrical current and thus receives electrical power from the fuel cell. The overall fuel cell reaction produces electrical energy as shown by the sum of the separate half-cell reactions written above. Water and heat are typical by-products of the reaction. Accordingly, the use of fuel cells in power generation offers potential environmental benefits compared with power generation from combustion of fossil fuels or by nuclear activity. Some examples of applications are distributed residential power generation and automotive power systems to reduce emission levels.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a separate cooling medium. Also within the stack are current collectors, cell-to-cell seals and insulation. Piping and various instruments are externally connected to the fuel cell stack for supplying and controlling the fluid streams in the system. The stack, housing, and associated hardware make up the fuel cell unit.

There are various known types of fuel cells. For example, proton exchange membrane (PEM) fuel cells are one of the most promising replacements for traditional power generation systems, as a PEM fuel cell enables a simple, compact fuel cell to be designed, which is robust and which can be operated at temperatures not too different from ambient temperatures. Usually, PEM fuel cells are fuelled by pure hydrogen gas, as it is electrochemically reactive and the by-products of the reaction are water and heat, which is environmentally friendly. A conventional PEM fuel cell usually comprises two flow field plates (bipolar plates), namely, an anode flow field plate and a cathode flow field plate, with a membrane electrode assembly (MEA) disposed therebetween. The MEA includes the actual proton exchange membrane and layers of catalyst for fuel cell reaction coated onto the membrane. Additionally, a gas diffusion media (GDM) or gas diffusion layer (GDL) is provided between each flow field plate and the PEM. The GDM or GDL facilitates the diffusion of the reactant gas, either the fuel or oxidant, to the catalyst surface of the MEA while providing electrical conductivity between each flow field plate and the PEM.

Each flow field plate typically has three apertures or openings at each end, each aperture representing either an inlet or outlet for one of fuel, oxidant and coolant. However, it is possible to have multiple inlets and outlets on flow field plates for each reactant gas or coolant, depending on the fuel cell or stack design. When a fuel cell is assembled, the anode flow field plate of one cell abuts against the cathode flow field plate of an adjacent cell. These apertures extend throughout the thickness of the flow field plates and align to form elongate distribution channels extending perpendicular to the flow field plates and through the entire fuel cell stack when the flow field plates stack together to form a complete fuel cell stack. A flow field usually comprises at least one, and in most cases, a plurality of open-faced flow channels that fluidly communicate between an appropriate inlet and outlet. As a reactant gas flows through the channels, it diffuses through the GDM and reacts on the MEA in the presence of the catalyst. A continuous flow through ensures that, while most of the fuel or oxidant is consumed, any contaminants are continually flushed through the fuel cell. The flow field may be provided on either face or both faces of the flow field plate. Typically, fuel or oxidant flow fields are formed respectively on the face of the anode and cathode flow field plate that faces toward the MEA (hereinafter; referred to as the "front face"). A coolant flow field may be provided on either the face of either of the anode or cathode flow field plate that faces away from the MEA (hereinafter, referred to as the "rear face").

When a complete fuel cell stack is formed, a pair of current collector plates are provided immediately adjacent the outmost flow field plates to collect current from the fuel cell stack and supply the current to an external electrical circuit. A pair of insulator plates are provided immediately outside of the current collector plates and a pair of end plates are located immediately adjacent the insulators. A seal is provided between each pair of adjacent plates. The seal is usually in the form of gaskets made of resilient materials that are compatible with the fuel cell environment. A fuel cell stack, after assembly, is commonly clamped to secure the elements and ensure that adequate compression is applied to the seals and active areas of the fuel cell stack. This method ensures that the contact resistance is minimized and the electrical resistance of the cells is at a minimum.

Various designs of the flow field have been known. One commonly known flow field pattern can be found in U.S. Pat. No. 4,988,583. A single continuous open-faced fluid flow channel is provided on one surface of a flow field plate. The flow channel has an inlet and an outlet, respectively located near two opposite ends of the flow field plate. The inlet and outlet are in fluid communication with gas distribution manifolds in the fuel cell stack. The flow channel traverses the surface of the flow field plate in a plurality of passes. The flow channel in the serpentine form provides a long flow channel without increasing the dimension of the flow field plate, thereby allowing somewhat sufficient diffusion of reactant gases from the flow channel to the MEA.

Extensive improvements have been made on the basis of this "serpentine" flow channel concept. These improvements can be found in U.S. Pat. Nos. 6,099,984 and 6,309,773. However, these designs suffer from a number of problems. Serpentine flow channels cause greater pressure drop when the reactant gases flow across the flow field. This is a serious problem that significantly affects the performance of the fuel cell when the fuel cell is operating under a relatively low pressure, for example, ambient pressure. The gas distribution in these designs is also not uniform along the tortuous flow paths. The gas flow is more turbulent in the serpentine flow field, making it more difficult to control the flow, pressure or temperature of the reactant gases. In addition, tortuous flow paths provide more places for water or contaminants to accumulate in the channels, increasing the risk of flooding or poisoning the fuel cell.

Another problem associated with most of flow field designs is the ribs and channels on the anode flow field plate often offset with those on the cathode flow field plates when placed in a fuel cell stack. As mentioned above, the anode and cathode flow field plate are placed adjacent the opposite side of the MEA and reactant gases flow through the chambers formed by GDM and the open-faced channels in the flow field. Since pressure is often applied on a fuel cell stack, the MEA and GDM are thus subject to shearing force, which may eventually damage the MEA. The offset of the ribs also impedes the distribution of reactant gases across GDM, reducing the fuel cell efficiency.

It can be appreciated from the previous discussion that a further problem in conventional fuel cell is that the sealing is often complicated. Various apertures on the MEA, flow field plates, current collector plates, etc must be sealed. In addition, as mentioned, a seal is required between each pair of adjacent plates and each seal would be of complex and elaborate construction. For any one reactant gas, it is conceivable to provide a seal that completely encloses all of the flow field and its inlet and outlet on the corresponding, first flow field plate. This will enable a good seal to be formed between that flow field plate and the MEA. However, on the other side of the MEA, it is necessary to provide a seal that completely encloses an aperture on a second flow field plate that corresponds to inlet and outlet on the first flow field plate. In this configuration, part of the membrane would lie over open channels on the first flow field plate, and hence not be properly supported, thereby running the risk of there being inadequate sealing, resulting in a mixing of gases, which is highly undesirable.

Therefore, there remains a need for a fuel cell flow field plate that provides a small pressure drop across the fluid flow field and more uniform gas distribution. Preferably, the flow field plate reduces the shearing effects on the MEA and simplifies sealing between flow field plates.

SUMMARY OF THE INVENTION

In accordance with the first aspect of the present invention, there is provided a fuel cell stack comprising a plurality of fuel cells, each fuel cell comprising an anode flow field plate, a cathode flow field plate and a membrane electrode assembly disposed between the anode and cathode flow field plates, wherein the anode flow field plate includes a plurality of anode primary channels and a plurality of ribs separating the anode primary channels, wherein the cathode flow field plate includes a plurality of cathode primary channels and a plurality of ribs separating the cathode primary channels, and wherein at least a portion of the anode primary channels and the cathode primary channels are disposed directly opposite one another with the membrane exchange assembly therebetween and with at least some of the ribs of the anode flow field plate matching the ribs on the cathode flow field plate and being located directly opposite one another to sandwich the membrane exchange assembly therebetween.

Preferably, each of the anode and cathode flow field plates has the portion of matching channels provided generally centrally.

More preferably, the fuel cell of the present invention is a fuel cell, wherein each of the anode and cathode flow field plates includes a fuel inlet aperture aligned with other fuel inlet apertures to form a fuel inlet duct, an oxidant inlet aperture aligned with other oxidant inlet apertures to form an oxidant inlet duct, a coolant inlet aperture aligned with other coolant inlet apertures to form a coolant inlet duct, a fuel outlet aperture for the fuel aligned with other fuel outlet apertures to form a fuel outlet duct, an oxidant outlet aperture aligned with other oxidant outlet apertures to form an oxidant outlet duct and a coolant outlet aperture aligned with other coolant outlet apertures to form a coolant outlet duct, and wherein, for each fuel cell, the anode flow field plate includes at least one fuel inlet distribution channel connecting the fuel inlet duct to the anode primary channels and at least one fuel outlet collection channel connecting the anode primary channels to the fuel outlet duct.

Correspondingly, for each fuel cell, the cathode flow field plate can include at least one oxidant inlet distribution channel connecting the oxidant inlet duct to the cathode primary channels, and at least one oxidant outlet collection channel connecting the cathode primary channels to the oxidant outlet duct.

Advantageously, flow field plates can include a provision for feeding gas from the rear thereof to the front face including the primary channels, the provision including slots extending through the respective flow field plate. The flow cross sections of the primary channels of the anode flow field plates can be different from the flow cross sections of the primary channels of the cathode flow field plate. This can be achieved by varying the depth of the channels.

It is preferred for the primary channels and the ribs, of each flow field plate to have a width ratio of 1.5:1. Where the cathode and anode primary channels have different depths, it is preferred for this ratio to be in the range of 1.5–3:1. More specifically, this could also be in the range 2–3:1 or 1.5–2:1, and even more specifically this could be 3:1.

Preferably, the inlet distribution and outlet collection channels have a width that is 1–1.5 times the width of the primary channels. At least for the inlet distribution and outlet collection channels, fillets can be provided, to reduce turbulence and reduce flow resistance.

More preferably, on the anode flow field plates, along the longitudinal direction of anode primary channels, each of the plurality of anode primary channels in connection with the corresponding fuel inlet distribution channel and the corresponding fuel outlet collection channel has one end spaced at a distance from the said fuel inlet distribution channel, and the other end spaced at a same distance from the said fuel outlet distribution channel, and wherein the ratio of the distance to the width of the anode primary channels is in the range of 1.5–2.

Correspondingly, on the cathode flow field plates, along the longitudinal direction of cathode primary channels, each of the plurality of cathode primary channels in connection with the corresponding oxidant inlet distribution channel and the corresponding oxidant outlet collection channel has one end spaced at a distance from the said oxidant inlet distribution channel, and the other end spaced at a same distance from the said oxidant outlet distribution channel, and wherein the ratio of the distance to the width of the cathode primary channels is in the range of 1.5–2.

It will be understood that while the invention is defined in relation to a fuel cell stack comprising a plurality of fuel cells, the number of cells in a fuel cell stack can be varied. It is conceivable that the fuel cell stack could comprise a single fuel cell, although for many applications it is desirable to provide a plurality of fuel cells, in series, in order to develop an adequate voltage.

The design of the fuel cell flow field plate in accordance with the present invention provides more uniform gas distribution and reduced pressure drop across the flow field. The substantially straight flow channels prevent building-up of water and impurities. The MEA and GDM in the present invention are subject to less, if any, shearing effects resulting from offset of ribs in flow fields. The gas distribution is also facilitated, thereby resulting in improved fuel cell efficiency and enhanced power density. Moreover, feeding of reactant gases from rear face of the flow field plates provides a possibility for simplified sealing between flow field plates, reducing the risk of mixing reactant gases. In addition, the matching design of flow field ribs makes it possible to use narrower ribs and wider flow channels in the flow field. Hence, more GDM and MEA are exposed directly to reactant gases. Consequently, a larger portion of the active area of MEA can be utilized. This further improves the fuel cell efficiency. All theses advantages contribute to a fuel cell with better performance and easier maintenance.

BRIEF DESCRIPTION OF THE DRAWINGS

For a better understanding of the present invention, and to show more clearly how it may be carried into effect, reference will now be made, by way of example, to the accompanying drawings, which show a preferred embodiment of the present invention and in which:

FIG. 2c shows an enlarged partial sectional view of the anode flow field plate of the fuel cell according to the present invention, taken along line A—A in FIG. 2a;

DETAILED DESCRIPTION OF THE PREFERRED EMBODIMENTS

Figure 1:
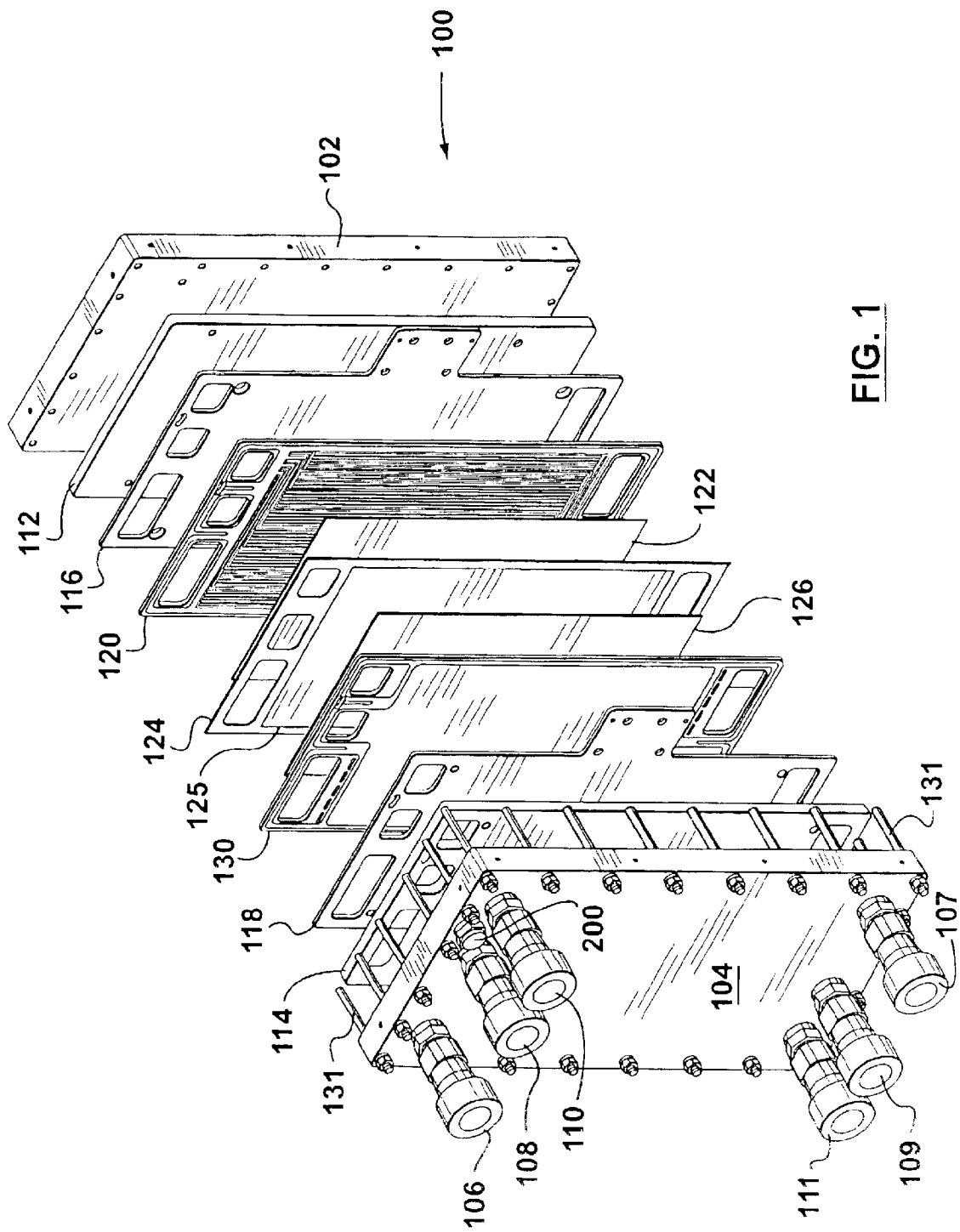
FIG. 1 shows an exploded perspective view of a fuel cell unit located within a fuel cell stack according to the present invention.

Referring first to FIG. 1, this shows an exploded perspective view of a single fuel cell unit 100 located within a fuel cell stack according to the present invention. It is to be understood that while a single fuel cell unit 100 is detailed below, in known manner the fuel cell stack will usually comprise a plurality of fuel cells stacked together. Each fuel cell of the fuel cell unit 100 comprises an anode flow field plate 120, a cathode flow field plate 130, and a membrane electrode assembly (MEA) 124 disposed between the anode and cathode flow field plates 120, 130. Each reactant flow field plate has an inlet region, an outlet region, and open-faced channels to fluidly connect the inlet to the outlet, and provide a way for distributing the reactant gases to the outer surfaces of the MEA 124. The MEA 124 comprises a solid electrolyte (i.e. a proton exchange membrane) 125 disposed between an anode catalyst layer (not shown) and a cathode catalyst layer (not shown). A first gas diffusion media (GDM) 122 is disposed between the anode catalyst layer and the anode flow field plate 120, and a second GDM 126 is disposed between the cathode catalyst layer and the cathode flow field plate 130. The GDMs 122, 126 facilitate the diffusion of the reactant gas, either the fuel or oxidant, to the catalyst surfaces of the MEA 124. Furthermore, the GDMs enhance the electrical conductivity between each of the anode and cathode flow field plates 120, 130 and the membrane 125.

In a catalyzed reaction, a fuel such as pure hydrogen, is oxidized at the anode catalyst layer of the MEA 124 to form protons and electrons. The proton exchange membrane 125 facilitates migration of the protons from the anode catalyst layer to the cathode catalyst layer. The electrons cannot pass through the proton exchange membrane 125, and are forced to flow through an external circuit (not shown), thus providing an electrical current. At the cathode catalyst layer of the MEA 124, oxygen reacts with electrons returned from the electrical circuit to form anions. The anions formed at the cathode catalyst layer of the MEA 124 react with the protons that have crossed the membrane 125 to form liquid water as the reaction product.

Still referring to FIG. 1, hereinafter the designations "front" and "rear" with respect to the anode and cathode flow field plates 120, 130 indicate their orientation with respect to the MEA 124. Thus, the "front" face indicates the side facing towards the MEA 124, while the "rear" face indicates the side facing away from the MEA 124. A first current collector plate 116 abuts against the rear face of the anode flow field plate 120. Similarly, a second current collector plate 118 abuts against the rear face of the cathode flow field plate 130. The current collector plates 116, 118 collect the current from the flow field plates 120, 130, and are connected to an external electrical circuit (not shown). First and second insulator plates 112, 114 are located immediately adjacent the first and second current collector plates 116, 118, respectively. First and second end plates 102, 104 are located immediately adjacent the first and second insulator plates 112, 114, respectively. Pressure may be applied on the end plates 102, 104 to press the unit 100 together. Moreover, sealing means are usually provided between each pair of adjacent plates. Preferably, a plurality of tie rods 131 may also be provided. The tie rods 131 are screwed into threaded bores in the cathode endplate 104, and pass through corresponding plain bores in the anode endplate 102. In known manner, fastening means, such as nuts, bolts, washers and the like are provided for clamping together the fuel cell unit 100 and the entire fuel cell stack.

Still referring to FIG. 1, the endplates 102, 104 are provided with a plurality of connection ports for the supply of various fluids. Specifically, the second endplate 104 has first and a second air connection ports 106, 107, first and second coolant connection ports 108, 109, and first and second hydrogen connection ports 110, 111. As will be understood by those skilled in the art, the MEA 124, the first and second gas diffusion media 122, 126, the anode and cathode flow field plates 120, 130, the first and second current collector plates 116, 118, the first and second insulator plates 112, 114, and the first and second end plates 102, 104 have three inlets near one end and three outlets near the opposite end thereof, which are in alignment to form fluid channels for air as an oxidant, a coolant, and hydrogen as a fuel. Also, it is not essential that all the outlets be located at one end, i.e., pairs of flows could be counter current as opposed to flowing in the same direction. Although not shown, it will be understood that the various ports 106–111 are fluidly connected to ducts that extend along the length of the fuel cell unit 100 and that are formed from apertures in individual flow field plates, as detailed below.

It will be understood by those skilled in the art that the coolant could be any known heat exchange fluid, including but not limited to water, deionized water, oil, ethylene glycol, and/or propylene glycol. While a variety of coolants could be used for the specific embodiments described herein, for simplicity, all the heat exchange fluids are deionized water in the described embodiments.

Figure 2A:
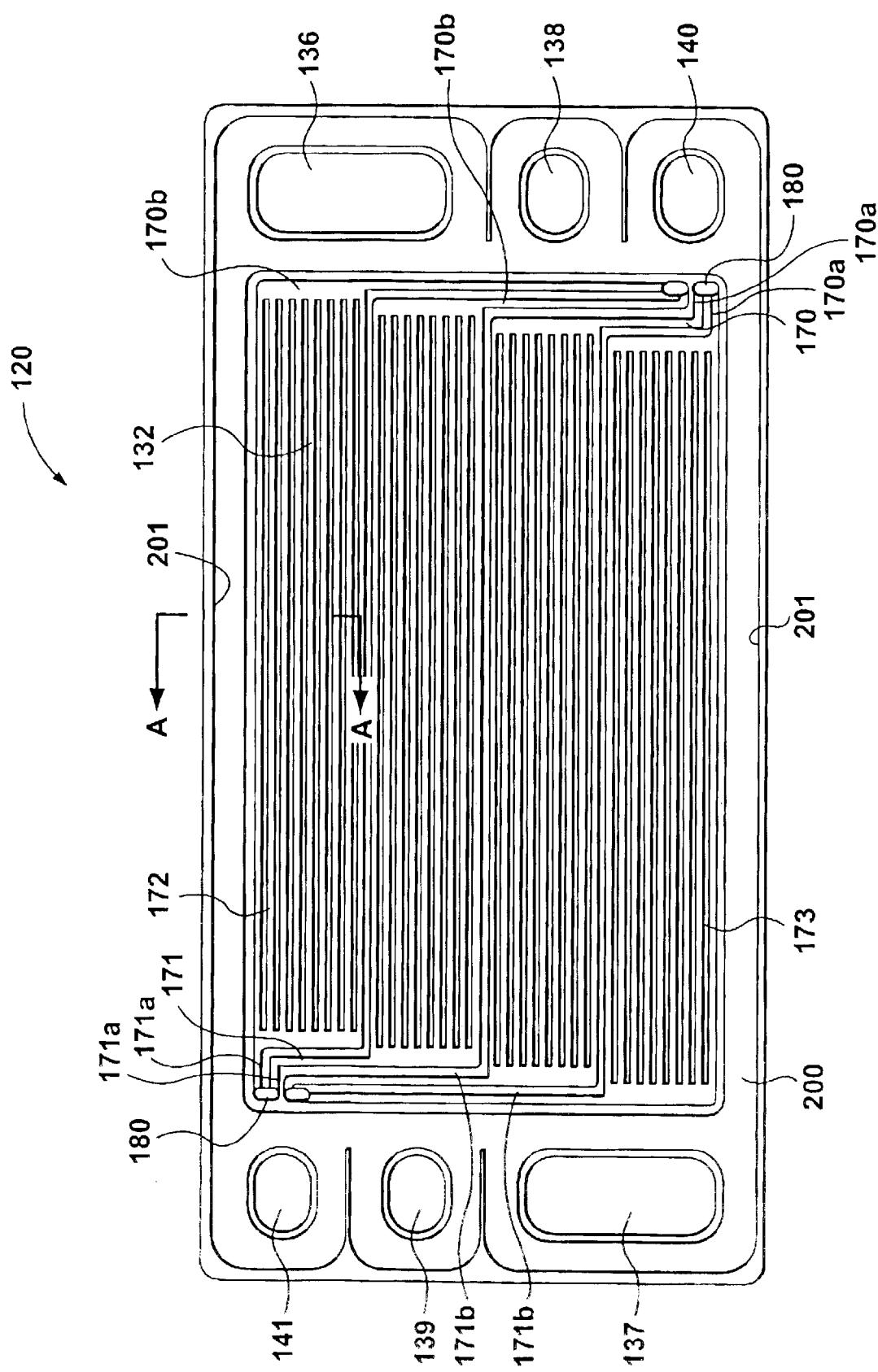
FIG. 2a shows a schematic view of the front face of the anode flow field plate of the fuel cell according to the present invention.

Referring now to FIG. 2a, this shows the front face of the anode flow field plate 120. The anode flow field plate 120 has three inlets near one end thereof, namely an anode air inlet aperture 136, an anode coolant inlet aperture 138, and an anode hydrogen inlet aperture 140, in fluid communication with the first air connection port 106, the first coolant connection port 108, and the first hydrogen connection port 110, respectively. The anode flow field plate 120 has three outlets near the opposite end, namely an anode air outlet aperture 137, an anode coolant outlet aperture 139 and an anode hydrogen outlet aperture 141, in fluid communication with the second air connection port 107, the second coolant connection port 109, and the second hydrogen connection port 111, respectively.

In FIG. 2a, the front face of the anode flow field plate 120 is provided with a hydrogen flow field 132 comprising a plurality of open-faced channels. This flow field 132 fluidly connects the anode hydrogen inlet aperture 140 to the anode hydrogen outlet aperture 141. However, hydrogen does not flow directly from the inlet aperture 140 to the flow field 132 on the front face of the anode flow field plate 120. The hydrogen flow between the flow field 132 and inlet 140 and outlet 141, respectively, will be described in more detail. As is known to those skilled in the art, when hydrogen flows along the channels in the flow field 132, at least a portion of the hydrogen diffuses across the first GDM 122 and reacts at the anode catalyst layer of the MEA 124 to form protons and electrons. The protons then migrate across the membrane 125 towards the cathode catalyst layer. The unreacted hydrogen continues to flow along the flow field 132, and ultimately exits the anode flow field plate 120 via the anode hydrogen outlet 141.

Still referring to FIG. 2a, a seal 200 is provided around the flow field 132 and the various inlets and outlets to prevent leaking or mixing of reactant gases and coolant. The seal, usually a gasket made of resilient materials compatible with fuel cell environment, is seated in a seal groove 201 on the front face of the anode flow field plate 120, as can be seen in FIG. 2c. The seal groove 201 is formed completely enclosing the flow field 132 and the inlets and outlets. The seal groove 201 can be formed using machining, etching and etc. As desirable, the groove may have varied depth (in the direction perpendicular to the plane of FIG. 2a) and/or width (in the plane of FIG. 2a) at different positions around the anode flow field plate 120. In fact, the seal gasket 200 completely separates the inlet and outlet apertures from the flow field 132 on the front face of the anode flow field plate 120. Usually, the seal groove 201 and the corresponding gasket have a constant depth.

Figure 2B:
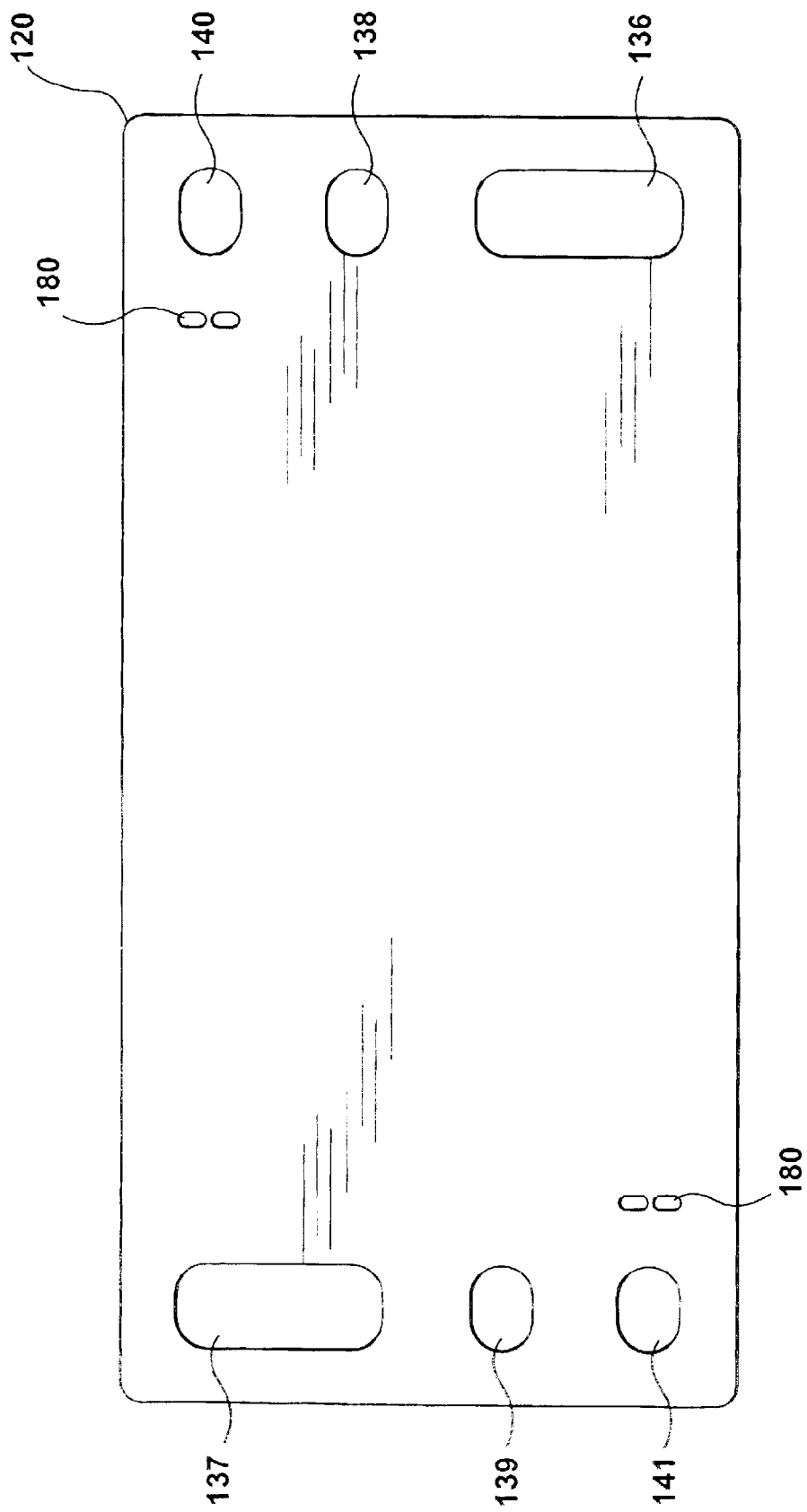
FIG. 2b shows a schematic view of the rear face of the anode flow field plate of the fuel cell according to the present invention.
Figure 2C:
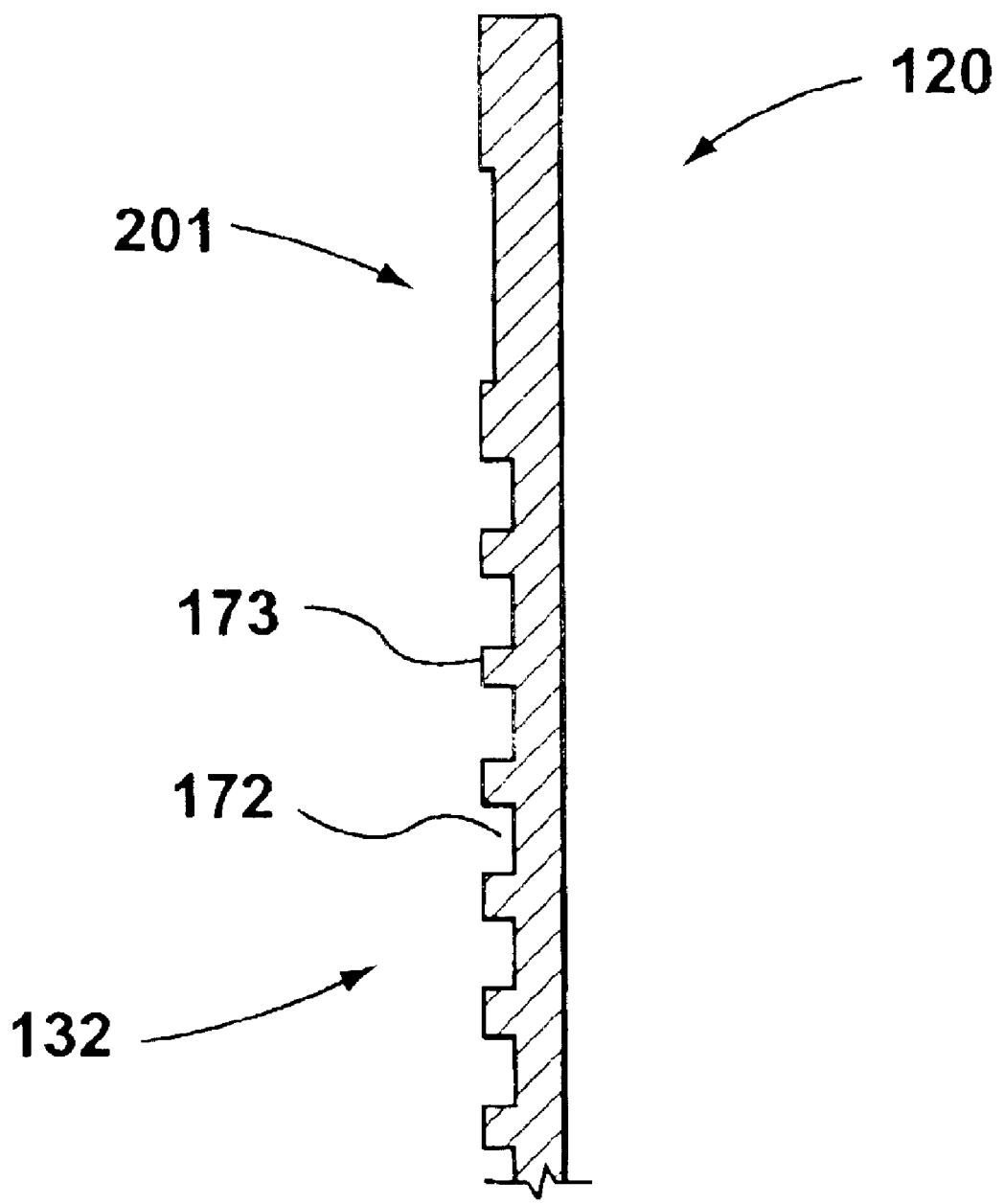

Now referring to FIG. 2b, this shows the rear face of the anode flow field plate 120. In the present invention, the rear face of the anode flow field plate 120 is flat, smooth, and is not provided with any flow channels. A number of slots 180, are provided adjacent the hydrogen inlet aperture 140 and the hydrogen outlet aperture 141. These slots penetrate the thickness of the anode flow field plate 120, thereby providing fluid communication to the front and rear faces of the anode flow field plate 120. No seal gasket or seal gasket groove is needed on the rear face of the anode flow field plate 120 of the present invention. This is an improvement over conventional fuel cell designs by simplifying the structure of the plate and hence reducing the manufacture cost. The sealing is achieved by the seal gasket on the rear face of the cathode flow field plate 130, as will be described below.

Figure 3A:
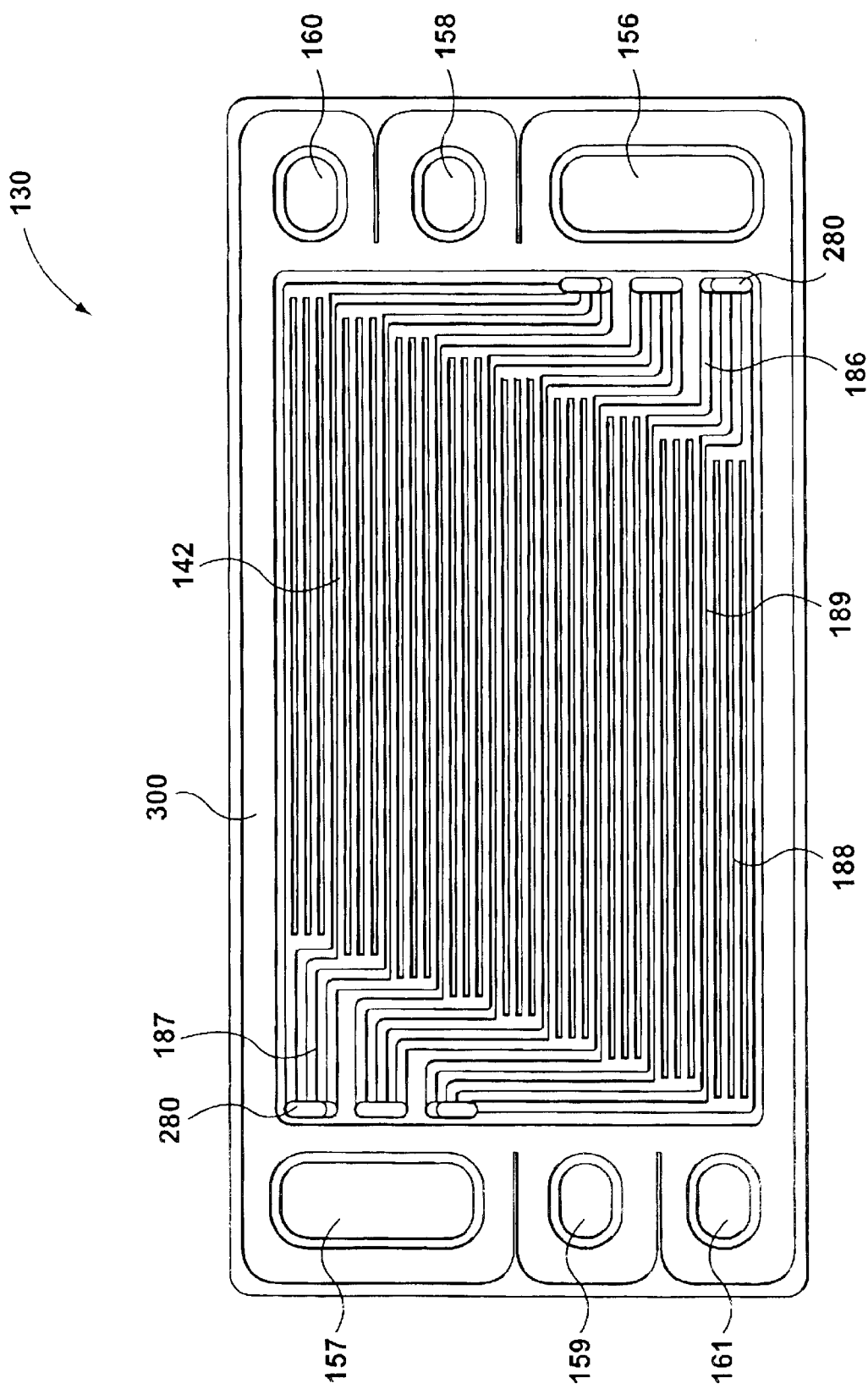
FIG. 3a shows a schematic view of the front face of the cathode flow field plate of the fuel cell according to the present invention.

Referring now to FIG. 3a, this shows the front face of the cathode flow field plate 130. The cathode flow field plate 130 has three inlets near one end thereof, namely a cathode air inlet aperture 156, a cathode coolant inlet aperture 158, and a cathode hydrogen inlet aperture 160, in fluid communication with the first air connection port 106, the first coolant connection port 108, and the first hydrogen connection port 110, respectively. The cathode flow field plate 130 has three outlets near the opposite end, namely a cathode air outlet aperture 157, a cathode coolant outlet aperture 159, and a cathode hydrogen outlet aperture 161, in fluid communication with the second air connection port 107, the second coolant connection port 109, and the second hydrogen connection port 111, respectively.

In FIG. 3a, the front face of the cathode flow field plate 130 is provided with an oxidant (usually air) flow field 142 comprising a plurality of open-faced channels. The flow field 142 fluidly connects the cathode air inlet aperture 156 to the cathode air outlet aperture 157. However, similar to the design of the anode flow field plate 120, air does not flow directly from the inlet aperture 156 to the flow field 142 on the front face of the cathode flow field plate 130. As is known to those skilled in that art, when the air flows along the channels in the flow field 142, at least a portion of the oxygen diffuses across the second GDM 126 and reacts at the cathode catalyst layer with the electrons returned from the external circuit to form anions. The anions then react with the protons that have migrated across the MEA 124 to form liquid water and heat. The unreacted air continues to flow along the flow field 142, and ultimately exits the cathode flow field plate 120 via the cathode air outlet 157.

On the anode flow field plate 120 and the cathode flow field plate 130, the various inlets and outlets 136–141 and 156–161 comprise apertures aligned with one another to form six ducts or channels extending through the fuel stack and, at their ends connected to respective ones of the ports 106–111.

Still referring to FIG. 3a, a seal 300 is provided around the flow field 142 and the various inlet and outlet apertures to prevent leaking or mixing of reactant gases and coolant. It will be appreciated that similar to the design of the anode flow field plate 120, the seal, usually a gasket made of resilient materials compatible with fuel cell environment, is seated in a seal groove on the front face of the cathode flow field plate 130. For simplicity, the seal groove is not shown herein. Likewise, the groove may have varied depth and/or width at different positions around the cathode flow field plate 130, as may be desired. In fact, the seal gasket 300 completely separates the inlet and outlet apertures from the flow field 142 on the front face of the cathode flow field plate 130.

Figure 3B:
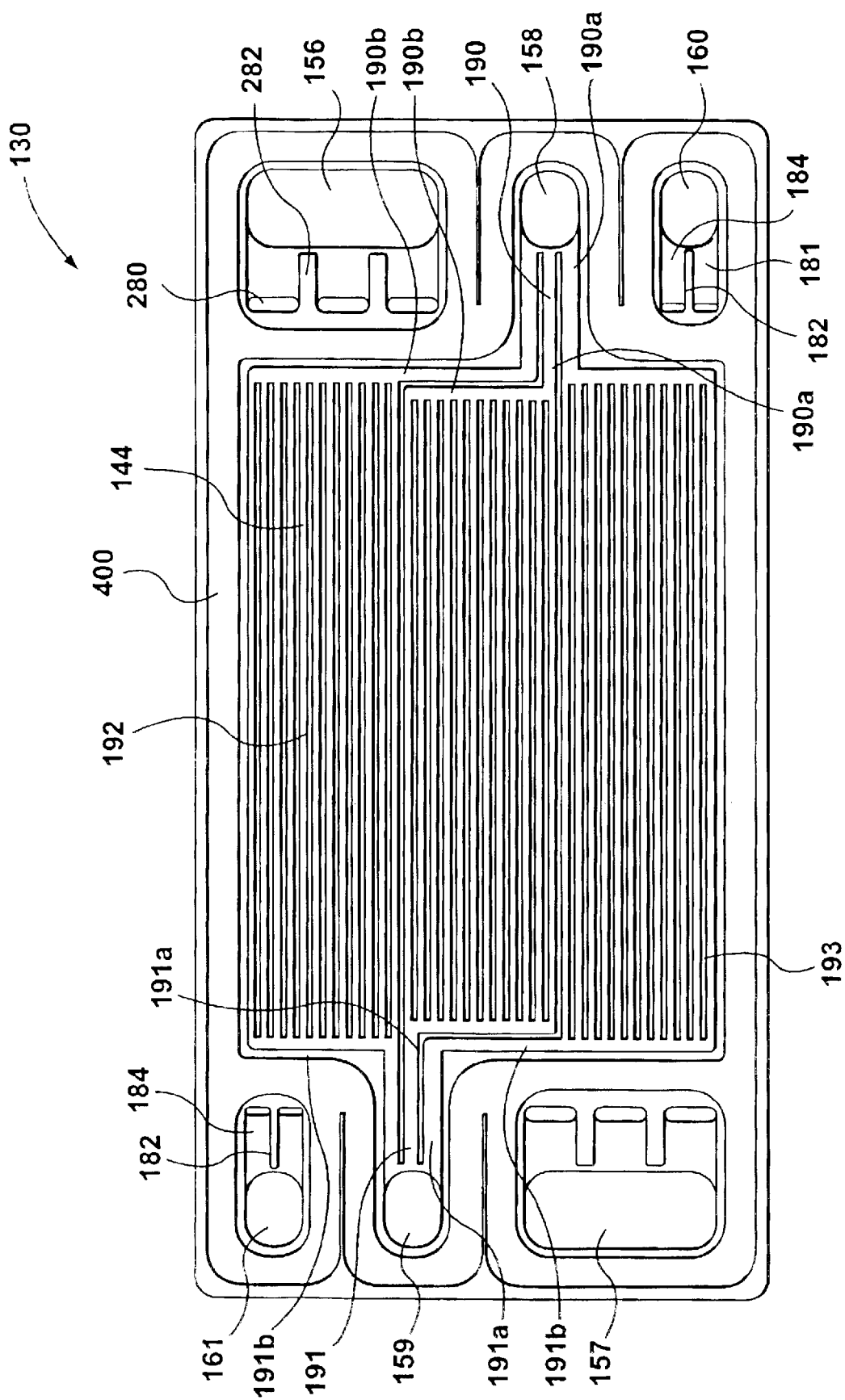
FIG. 3b shows a schematic view of the rear face of the cathode flow field plate of the fuel cell according to the present invention.

Referring now to FIG. 3b, this shows the rear face of the cathode flow field plate 130. In the present invention, the rear face of the cathode flow field plate 130 is provided with a coolant flow field 144 comprising a plurality of open-faced flow channels. Similar to the front faces of the anode and cathode flow field plates 120 and 130, a seal 400 is provided around the coolant flow field 144 and the various inlet and outlet apertures. It can be appreciated that the seal is seated in a seal groove on the rear face of the cathode flow field plate 130. For simplicity, the seal groove is not shown herein. Likewise, the groove may have varied depth and/or width at different positions around the cathode flow field plate 130, as may be desired. However, whereas the seal gaskets 200, 300 completely separate the inlet and outlet apertures from the anode and cathode flow fields 132, 142 on the front face of the anode and cathode flow field plates 120, 130, the seal gasket 400 only completely seals the inlets and outlets of hydrogen and air from the coolant flow field 144, permitting water to flow between the flow field and the coolant inlet and outlet apertures 158, 159.

This flow field 144 fluidly connects the cathode coolant inlet aperture 158 to the cathode coolant outlet aperture 159. Water enters the cathode coolant inlet aperture 158, flows along the channels in the flow field 144, and ultimately exits the coolant flow field 144 via the cathode coolant outlet aperture 159. As the fuel cell reaction is exothermic and the reaction rate is sensitive to temperature, the flow through of the water takes away the heat generated in the fuel cell reaction, preventing the temperature of the fuel cell stack from increasing, thereby regulating the fuel cell reaction at a stable level.

Figure 3C:
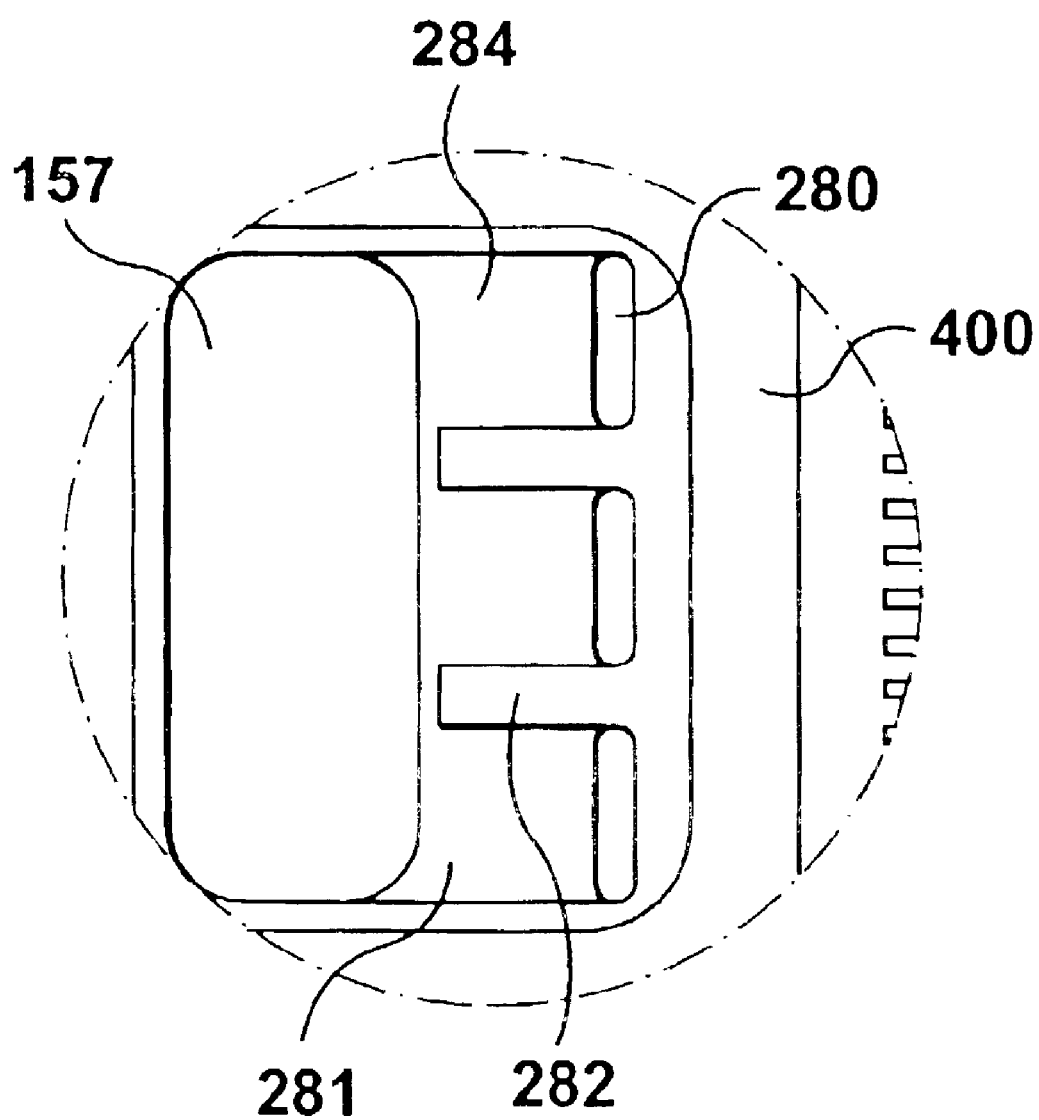
FIG. 3c shows an enlarged partial view of the air outlet and adjacent parts on the rear face of the cathode flow field plate of the fuel cell according to the present invention.
Figure 3D:
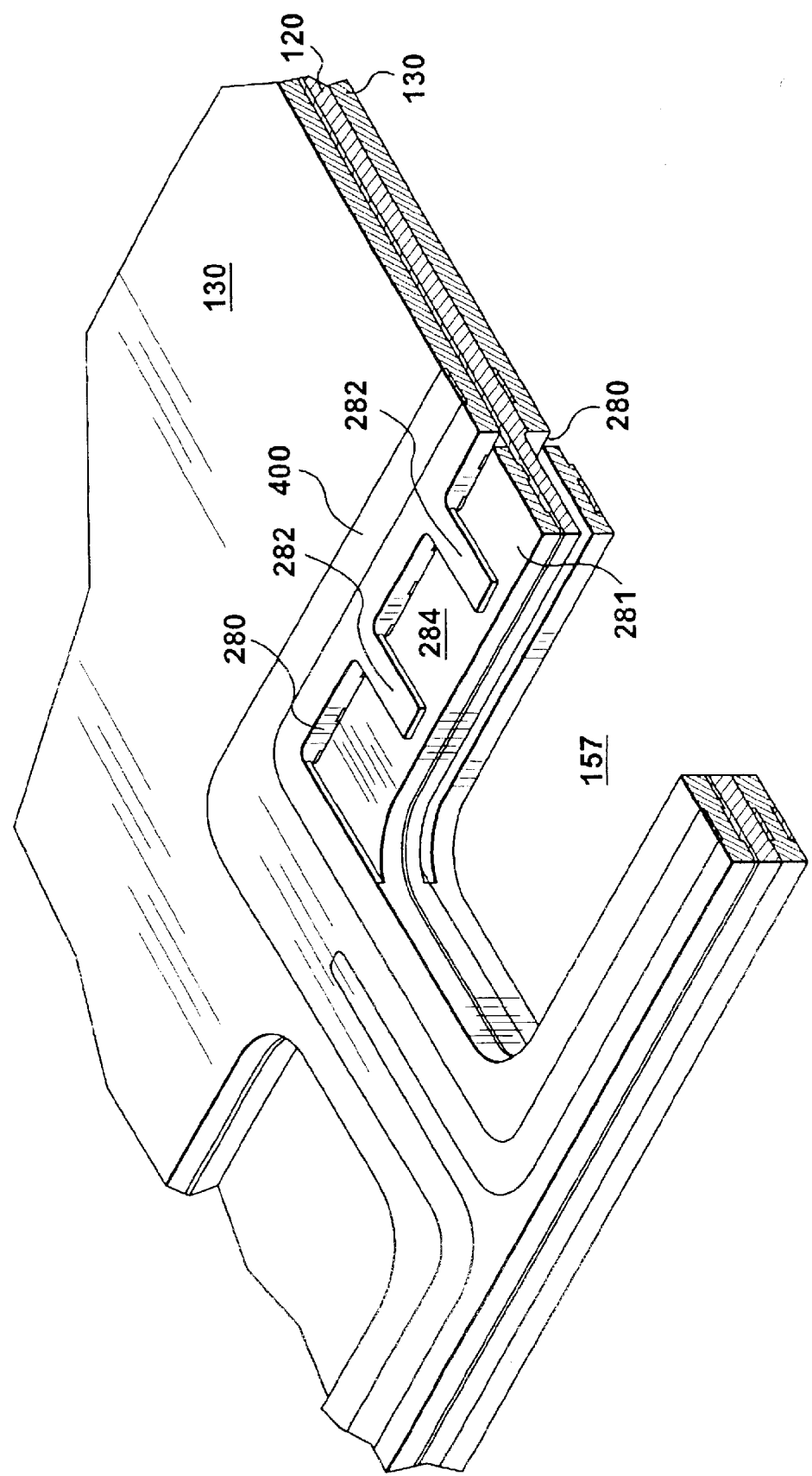
FIG. 3d shows an enlarged partial perspective view of the air outlet and adjacent parts on the rear face of the cathode flow field plate of the fuel cell according to the present invention.

Now referring to FIGS. 3b to 3d, each of the air inlet and outlet apertures 156, 157 has an aperture extension 281 on the rear face of the cathode flow field plate 130 towards the coolant flow field 144. A number of slots 280 are provided adjacent the air inlet aperture 156 and the air outlet aperture 157 in the aperture extension. These slots penetrate the thickness of the cathode flow field plate 130, thereby fluidly communicating the front and rear faces of the cathode flow field plate 130. The aperture extension 281 are provided with a number of protrusions 282 extending between the slots 280 towards the air inlet aperture 156 or air outlet aperture 157, respectively. As can be better seen from FIG. 3d, the protrusions 282 have substantially the same height as the seal gasket 400 and define a number of flow channels 284, stopping short of the edge of the air inlet aperture 156 or the air outlet aperture 157, thereby facilitating the air flow between the slots 280 and the air inlet aperture 156 or the air outlet aperture 157. The seal gasket 400 completely separates the aperture extension 281, and hence the slots 280, from the coolant flow field 144 and other inlet and outlet apertures.

The cathode hydrogen inlet aperture 160 and outlet aperture 161 also each have a respective aperture extension 181. Similarly, the aperture extensions 181 are provided with a number of protrusions 182 extending towards the hydrogen inlet aperture 160 and outlet aperture 161, respectively. The protrusions 182 are manufactured in such positions on the cathode flow field plate 130 that they extend between slots 180 of the anode flow field plate 120, when the rear face of the cathode flow field plate 130 and that of the anode flow field plate 120 abut against each other; it will be understood that anode and cathode flow field plates 120, 130 have abutting rear faces, and this necessarily means that the anode plate 120 is part of one fuel cell and the cathode plate 130 is part of an adjacent fuel cell. In FIG. 3b, only one such protrusion 182 is shown, corresponding to the two slots 180 shown in FIG. 2b. However, it is to be understood that the figures are only used for illustration purpose and the actual number of protrusions 182, 282 and slots 180, 280 are not necessarily the same as shown in the figures. The protrusions 182 have substantially the same height as the seal gasket 400, define a number of flow channels 184 and stop short of the edge of the hydrogen inlet aperture 160 or the hydrogen outlet aperture 161, thereby facilitating the hydrogen flow between the slots 180 and the hydrogen inlet aperture 160 or the hydrogen outlet aperture 161. The seal gasket 400 completely separates the aperture extension 181, and hence the slots 180, from the coolant flow field 144 and other inlet and outlet apertures.

Of course, it is also possible to provide the aperture extension 181 and the protrusions 182 thereon adjacent the anode hydrogen aperture inlet 140 and aperture outlet 141 on the rear face of the anode flow field plate 120. In this case, the gasket 400 on the rear face of the cathode flow field plate 130 is to be configured such that it encloses the anode hydrogen inlet aperture 140, outlet aperture 141 and the associated aperture extension 181, protrusions 182 as well as slots 180.

As an alternative, it is possible that the necessary aperture extensions for a gas can be provided on the plate for that gas. Thus, the hydrogen or fuel gas inlet and outlet apertures 140, 141 can be provided with aperture extensions on the rear face of the anode plate. Correspondingly, for the cathode plate, the oxidant inlet and outlet apertures 156, 157 can be provided with aperture extensions on the rear thereof. In both cases, appropriate slots can be provided in each plate, passing through the plate.

It is further possible that, to provide improved flow, each of the anode and cathode plates 120, 130 can be provided with aperture extensions for both the fuel gas flow and the oxidant flow. In effect, an extension chamber would then be provided, partly in one of the plates and partly in the other of the plates, extending from the respective duct, towards slots extending through to the front face of a plate. Conceivably, this configuration could be desirable where the thickness of the plates is reduced. It will be understood that, in this art, it is desirable to provide a fuel cell stack with as high a power density as possible, and for this reason, it is always desirable to make the flow field plates as thin as possible.

It will also be understood that providing a flat face for at least one of the flow field plates has a number of advantages. It simplifies the design of that flow field plate, and should simplify the production thereof. It additionally greatly simplifies sealing arrangements and minimizes the requirements for accurate alignment of plates. In effect, for the flat face, greater tolerances in alignment can be accepted, and dimensions for extension apertures, slots etc., can be set accordingly, to accommodate permitted tolerances.

When the fuel cell stack 100 is assembled, the rear face of the anode flow field plate of one cell abuts against that of the cathode flow field plate of an adjacent cell. The seal gasket 400 on the rear face of cathode flow field plate 130 is in contact with the smooth rear face of the anode flow field plate 120 to achieve sealing between the two plates. Therefore, the hydrogen inlet aperture 160, outlet aperture 161 and the aperture extension 181 thereof respectively define a chamber with the rear face of the anode flow field plate 120. The hydrogen enters through the first hydrogen connection port 110, flows through the duct formed by the anode and cathode hydrogen inlet apertures 140 and 160 throughout the fuel cell stack, and flows to the aforementioned chambers. From here, for each fuel cell, the hydrogen flows along the channels 184 of the aperture extension 181 on the cathode flow field plate 130 of one fuel cell, through the slots 180 on the anode flow field plate 120 of an adjacent fuel cell to the hydrogen flow field 132 on the front face of the anode flow field plate 120. This design of feeding hydrogen from the opposite side of the flow field 132 is referred to as "back side feed", and is the subject of an earlier pending patent application, U.S. patent application Ser. No. 09/855,018. The flow pattern of hydrogen on the flow field 132 will be described in detail below.

In the same manner, the air inlet aperture 156, an air outlet aperture 157 and the aperture extension 281 thereof respectively define a chamber with the rear face of the anode flow field plate 120. The air enters through the first air connection port 106, flows through the duct formed by the anode and cathode air inlet aperture 136 and 156, and flows to the aforementioned chambers. From here, the air flows along the channels 284 of the aperture extension portion 281 on the cathode flow field plate 130, through the slots 280 on the cathode flow field plate 130 to the oxidant flow field 142 on the front face of the cathode flow field plate 130. Again, the oxidant is also fed from "back side" in the present invention. The flow pattern of air on the flow field 142 will be described in detail below.

Now referring back to FIG. 2a, this shows the pattern of the hydrogen flow field 132 on the front face of the anode flow field plate 120. As shown in FIG. 2a, a number of first or fuel inlet distribution channels 170 are in fluid communication with the slots 180 adjacent the hydrogen inlet 140; essentially, there is a pair of the inlet distribution channels in communication with each of the slots 180. The first or fuel inlet distribution flow channels 170 extend substantially transversely to a main or central portion of the flow field 132 to different extents. In order to offset and accommodate others of the inlet distribution channels 170, some of the first or distribution channels 170 have a short longitudinally extending portion 170a immediately adjacent the slots 180 adjacent the hydrogen inlet aperture 140 and then have portions 170b extending transversely of the flow field 132 as indicated. Then each first or inlet distribution channel 170 divides into a plurality of central or primary flow channels 172, separated by a plurality of ribs 173. These primary flow channels 172 are straight and extend in parallel relation along the length of the flow field 132 from the hydrogen inlet aperture 140 towards the hydrogen outlet aperture 141.

At the outlet, a number of second or fuel outlet collection flow channels 171 are in fluid communication with the slots 180 adjacent the hydrogen outlet aperture 141. Correspondingly, the second or fuel outlet collection channels 171 extend substantially transversely of the flow field 132 to different extents. In order to offset and accommodate others of the fuel outlet collection channels 171, some of the second or fuel outlet collection channels 171 have a short longitudinally extending portion 171a immediately adjacent the slots 180 adjacent the hydrogen outlet aperture 141 and then have portions 171b extending transversely of the flow field 132. The second or outlet collection flow channels 171 are positioned in inverse correspondence with the first or inlet distribution flow channels 170. The plurality of primary channels 172 divided from each first or inlet distribution flow channel 170 then converge into one corresponding second or outlet collection flow channel 171. It is to be noted that the longitudinally extending portions 170a, 171a of the first and second flow channels 170, 171 are significantly shorter, as compared with the length of the primary channels 172. The number of primary channels 172 that is associated with each collection and distribution channel 170, 171 may or may not be the same. Additionally, it is not essential that all the primary channels 172 fed from one inlet distribution flow channel 170 are connected to the same outlet collection channel 171, and vice versa. As may be desired, the width of the ribs 173 and/or flow channels 172 can be adjusted to obtain different channel to rib ratios.

Accordingly, the hydrogen flows separately from the slots 180 adjacent the hydrogen inlet aperture 140 into the first or fuel inlet distribution flow channels 170. Then the hydrogen flow in each of the first or fuel inlet distribution flow channels 170 is further separated into the plurality of central or primary channels 172. The hydrogen flows along the plurality of primary channels 172 and then is collected by the second or outlet collection channels 171 at the opposite end of the anode flow field 132. Consequently, hydrogen flows along the second or outlet collection flow channels 171, through the slots 180 adjacent the hydrogen outlet aperture 141 to the rear face of the anode flow field plate 120. As mentioned above, the cathode hydrogen outlet 161 and its extension portion 181 define a chamber with the rear face of the anode flow field plate 120. Therefore, the hydrogen enters the chamber, flows through the duct formed by the anode and cathode hydrogen outlets apertures 141 and 161 throughout the fuel cell stack, and leaves the fuel cell stack through the second hydrogen connection port 111. The division of the hydrogen flow into the first or inlet distribution channels 170 and then into the plurality of primary channels 172, with corresponding collection at the outlet, improves the distribution of the hydrogen gas and achieves a more uniform hydrogen dissipation across GDM, thereby reducing the pressure differential transversely across the flow field and improving fuel cell efficiency.

Now referring to FIG. 3a, this shows the pattern of the oxidant flow field 142 on the front face of the cathode flow field plate 130, and a generally similar scheme is used to the oxidant flow field. Here, the oxidant is ambient air (suitably filtered, humidified and otherwise treated). As oxygen comprises only approximately 20% of air, a much greater volume and mass flow are required. For this reason, the air inlet 156 and outlet 157 are larger and are provided with three slots 280. As shown in FIG. 3a, a number of third or oxidant inlet distribution channels 186 are in fluid communication with the slots 280 adjacent the air inlet aperture 156. The third or inlet distribution channels 186 extend substantially transversely to a main or central portion of the flow field 142 to different extents. In order to offset and accommodate others of the oxidant inlet distribution channels 186, some of the oxidant inlet distribution channels 186 have a short longitudinally extending portion 186a immediately adjacent the slots 280 adjacent the air inlet aperture 156 and then have portions 186b extending transversely of the flow field 142. Then each third or oxidant inlet distribution channel 186 divides into a plurality of central or primary channels 188, separated by a plurality of ribs 189. These primary channels 188 are straight and extend in parallel relation along the length of the flow field 142 from the air inlet aperture 156 towards the air outlet aperture 157.

At the outlet, a number of fourth or oxidant outlet collection channels 187 are in fluid communication with the slots 280 adjacent the air outlet aperture 157. Correspondingly, the fourth or outlet collection channels 187 extend substantially transversely of the flow field 142 to different extents. In order to offset and accommodate others of the outlet collection channels 187, some of the fourth or outlet collection flow channels 187 have a short longitudinally extending portion 187a immediately adjacent the slots 280 adjacent the air outlet aperture 157 and then have portions 187b extending transversely of the flow field 142. The fourth or outlet collection channels 187 are positioned in inverse correspondence with the third or inlet distribution flow channels 186. The plurality of primary channels 188 divided from each third or oxidant inlet distribution channel 186 then converge into one corresponding fourth or outlet collection channel 187. It is to be noted that the longitudinally extending portions of the oxidant inlet distribution and oxidant outlet collection channels 186, 187 are significantly shorter, as compared with the length of the primary channels 188. The number of primary channels 188 that is associated with each oxidant inlet distribution and oxidant outlet collection channel 186, 187 may or may not be the same. As may be desired, the width of the ribs 189 and/or flow channels 188 can be adjusted to obtain different channel to rib ratios. Similarly, for the fuel or hydrogen flow field, it is not essential that all the primary channels 188 fed from one oxidant inlet distribution channel 186 are connected to the same oxidant outlet collection channel 187, and vice versa.

Accordingly, the air flows separately from the slots 280 adjacent the air inlet aperture 156 into the third or oxidant inlet distribution channels 186. Then the air flow in each of the third or oxidant inlet distribution channels 186 is further separated into the plurality of central or primary channels 188. The air flows along the plurality of primary channels 188 and is collected by the fourth or oxidant outlet collection channels 187 at the opposite end of the cathode flow field 142. Consequently, air flows along the fourth or oxidant outlet collection channels 187, through the slots 280 adjacent the air outlet 157 to the rear face of the cathode flow field plate 130. As mentioned above, the cathode air outlet aperture 157 and its aperture extension 281 define a chamber with the rear face of the anode flow field plate 120. Therefore, the air enters the chamber, flows through the duct formed by the cathode and cathode air inlet apertures 137 and 157 throughout the fuel cell stack, and leaves the fuel cell stack through the second air connection port 107. The division of the air flow into the third or oxidant inlet distribution channels 186 and then into the plurality of primary flow channels 188, with corresponding collection at the outlet, improves the distribution of the air and achieves a more uniform air dissipation across GDM, thereby reducing the pressure differential transversely across the flow field and improving fuel cell efficiency.

Now referring to FIG. 3b, this shows the pattern of the coolant flow field 144 on the rear face of the cathode flow field plate 130. As shown in FIG. 3b, a number of fifth or coolant inlet distribution channels 190 are in fluid communication with the coolant inlet aperture 158. The fifth or coolant inlet distribution channels 190 have longitudinally extending portions 190a from the coolant inlet aperture 158 and then have portions 190b extending substantially transversely of the flow field 144, to different extents. The fifth or coolant inlet distribution channels 190 have varied lengths in their longitudinally extending portions 190a in order to accommodate the length of the flow field 144 and others of the coolant inlet distribution channels 190. Then each fifth or coolant inlet distribution channel 190 divides into a plurality of primary channels 192, separated by a plurality of ribs 193. These primary channels 192 are straight and extend in parallel relation along the length of the flow field 144 from the coolant inlet aperture 158 towards the coolant outlet aperture 159.

A number of sixth or coolant outlet collection channels 191 are in fluid communication with the coolant outlet aperture 159. The sixth or coolant outlet collection channels 191 have longitudinally extending portions 191a from the coolant outlet 159 and then have portions 191b extending substantially transversely of the flow field 144, to different extents. The sixth or coolant outlet collection channels 191 have varied lengths in their longitudinally extending portions 191a in order to accommodate the length of the flow field 144 and others of the coolant outlet collection flow channels 191. The sixth or coolant outlet collection channels 191 are positioned in inverse correspondence with the fifth or coolant inlet distribution channels 190. The plurality of primary channels 192 divided from each fifth or coolant inlet distribution channel 190 then converge into one corresponding sixth or coolant outlet collection channel 191. It is to be noted that the longitudinally extending portions 190a, 191a of the fifth and sixth flow channels 190, 191 are significantly shorter as compared with the length of the primary channels 192. The number of primary channels 192 that is divided from each fifth or coolant inlet distribution channel 190 may or may not be the same. Again, it is not essential that all the flow channels divided from a coolant inlet distribution channel 190 be connected to one coolant outlet collection channel 191, and vice versa. As may be desired, the width of the ribs 193 and/or primary channels 192 can be adjusted to obtain different channel to rib ratios.

Accordingly, the coolant enters from a first coolant connection port 108 and flows through the duct formed by anode and cathode coolant inlet apertures 138 and 158 to the cathode coolant inlet aperture 158. From here, coolant flows separately from the coolant inlet aperture 158 into the fifth or coolant inlet distribution channels 190. Then the coolant flow in each of the fifth channels 190 is further separated into a plurality of primary channels 192. Coolant flows along the plurality of primary channels 192 and then is collected into a number of sixth or coolant outlet collection channels 191 at the opposite end of the coolant flow field 144. Consequently, coolant flows along the sixth or coolant outlet collection flow channels 191 to the coolant outlet aperture 159. From here, the coolant flows through the duct formed by the cathode and cathode coolant outlet apertures 139 and 159 throughout the fuel cell stack, and leaves the fuel cell stack through the second coolant connection port 109. The division of the coolant flow from the fifth or coolant inlet distribution flow channels 190 into the plurality of central or primary channels 192 improves the distribution of the coolant and achieves more uniform and efficient heat transfer across the flow field.

In the present invention, the anode flow field 132, the cathode flow field 142 and/or the coolant flow field 144 employ a concept of dividing the channels into a number of groups. This concept provides more uniform fluid distribution across each flow field without increasing the complexity of the flow field design. The present invention also permits the utilization of straight flow channels, which offers some inherent advantages over tortuous flow channels.

Figure 3E:
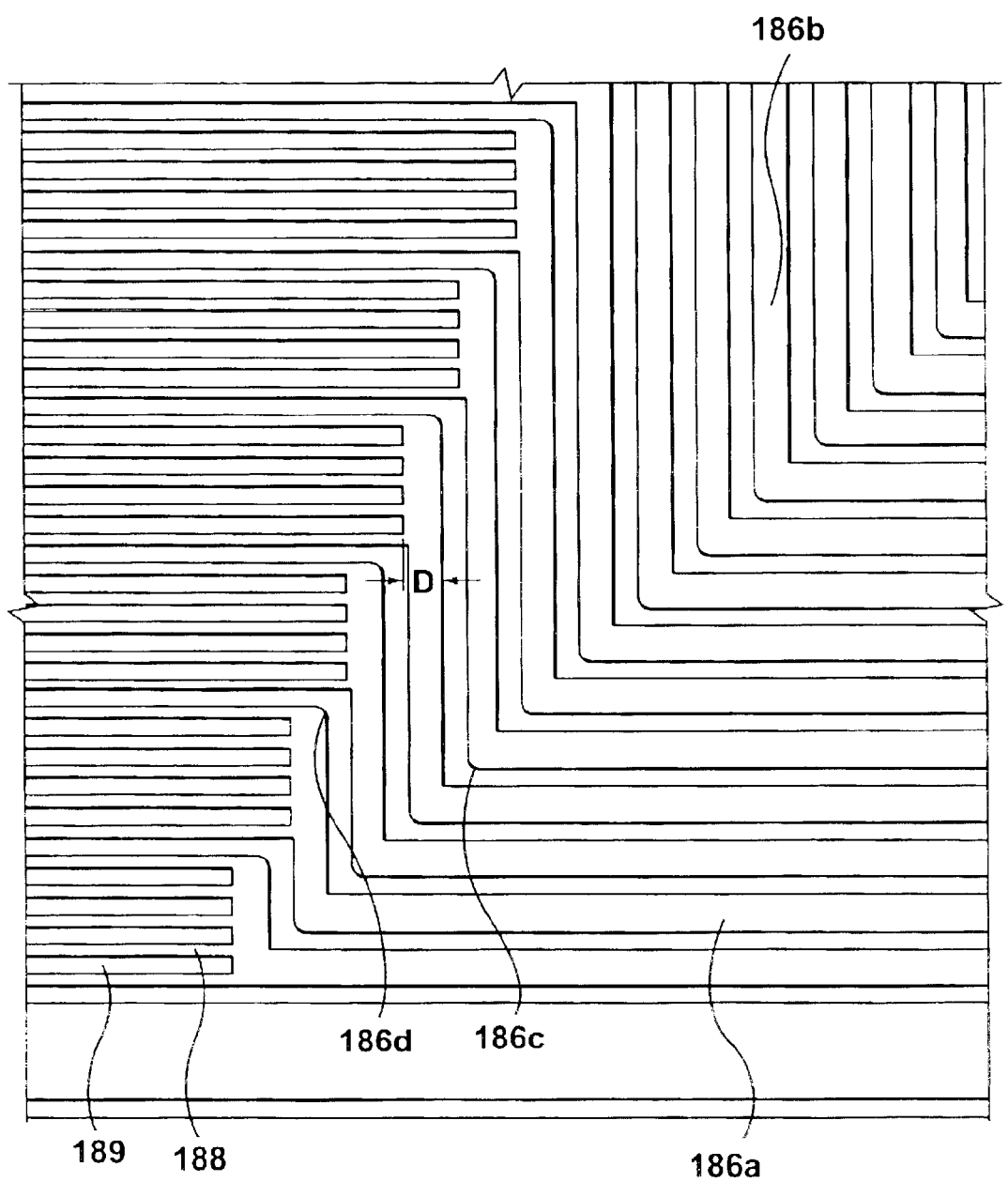
FIG. 3e shows an enlarged partial view of an example of the oxidant inlet distribution channels and primary channels on the front face of the cathode flow field plate of the fuel cell according to the present invention.

Now referring to FIG. 3e, this shows the enlarged view of oxidant inlet distribution channels 186a and 186b on the front face of a cathode flow field plate 130. In this particular example, each inlet distribution channel 186b is divided into five primary channels 188, separated by four ribs 189. Along the longitudinal direction of primary channels 188 (i.e. the direction of flow field 142), each primary channel 188 begins at a position spaced from the inlet distribution channel 186b extending transversely of the flow field 142. In this example, the beginnings of all primary channels 188, as set by the ribs 189, are spaced from the inlet distribution channels 186b at substantially same distance D. It is to be understood that this is not necessary and hence each primary channel may start from a different position with respect to inlet distribution channels 186b. In this example, the distance D between the inlet distribution channels 186b and the beginning of primary channels 188 is preferably 1.5–2 times the width of the primary channels 188 to create better flow distribution and minimize pressure drop; this distance D could be greater depending upon the width of the inlet distribution channels. The width of the inlet distribution channels 186a, 186b is preferably 1–1.5 times that of the primary channels 188.

It is to be understood that on the front face of the anode flow field plate 120, the beginning of primary channels 172 are also spaced from the fuel inlet distribution channels 170b at a distance. The distance is preferably 1.5–2 times the width of the primary channels 172. Furthermore, the opposite ends of the primary channels 172 are also spaced from the fuel outlet collection channels 171b and the distance is preferably 1.5–2 times the width of the primary channels 172. Likewise, the opposite ends of the primary channels 188 are also spaced from the oxidant outlet collection channels 187*b* and the distance is preferably 1.5–2 times the width of the primary channels 188.

As shown in FIG. 3*e*, at each joint of inlet distribution channels 186*a* and 186*b*, a fillet 186*c* is provided to facilitate the oxidant gas flow and reduce disturbance. Similarly, a fillet 186*d* is provided at the joint of a primary channel 188 and an inlet distribution channel 186*b*. The fillets 186*c* and 186*d* help to create a less turbulent flow pattern and hence reduce pressure drop across the flow field 142. The fillets 186*c* preferably have a radius of 0.03125 inch or 0.79 mm and the fillets 186*d* preferably have a radius of 1/64 inch or 0.395 mm. It can be appreciated that fillets can also be provided in fuel inlet distribution channels 170 and fuel outlet collection channels 171 on the front face of the anode flow field plate 120, as well as oxidant outlet collection channels 187 on the front face of the cathode flow field pate 130.

In the foregoing, channels for fuel gas, oxidant and coolant have been designated as "primary", in the sense that such channels will generally be central in the plate and will generally comprise the bulk of the channels present. The primary channels are selected to provide uniform fuel distribution across the appropriate face, and ideally would extend over the entire flow field area. Practically, to provide inlet and outlet manifold functions, it is necessary to provide the inlet distribution and outlet collection channels.

It will also be understood that the inlet distribution and outlet collection channel configuration, provides a branch structure where gas flow first passes along one channel (the inlet distribution channel) and then branches into a number of smaller channels (the primary channels). This structure could include further levels of subdivision. For example, the inlet distribution channel could be connected to a number of secondary distribution channels, each of which in turn could be connected to a number of the primary channels. Correspondingly, at the outlet, there would then be provided secondary collection channels that collect gas from a number of the primary channels, and these secondary collection channels would in turn be connected to a single outlet collection channel.

Figure 4A:
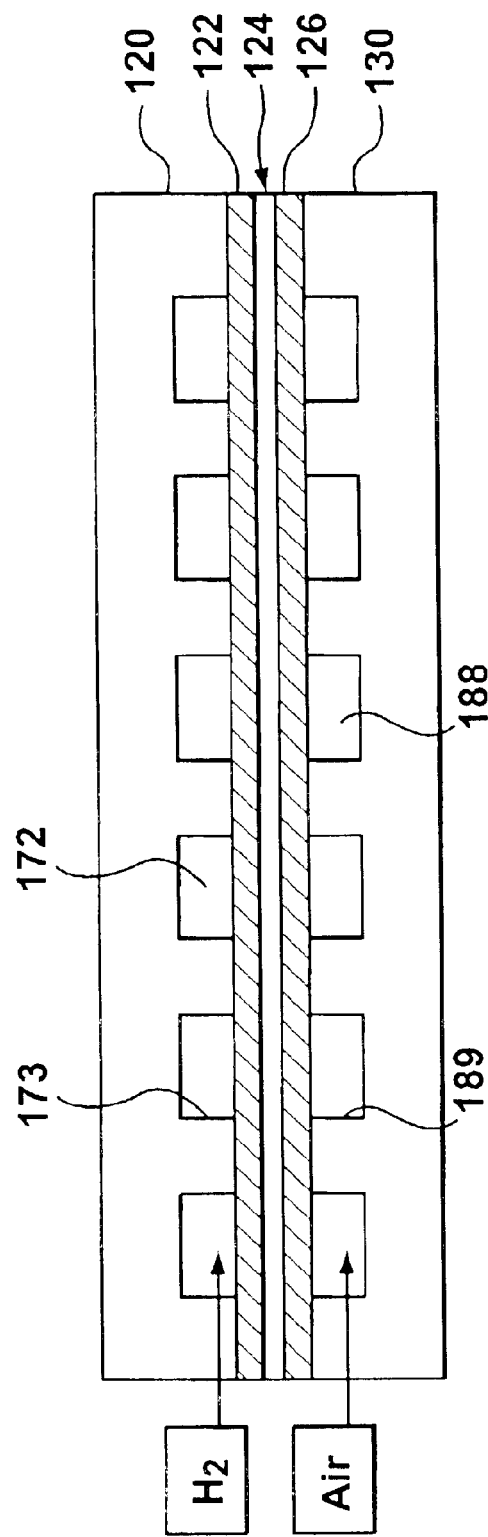
FIG. 4a shows a sectional view of fuel cell according to the present invention.
Figure 4B:
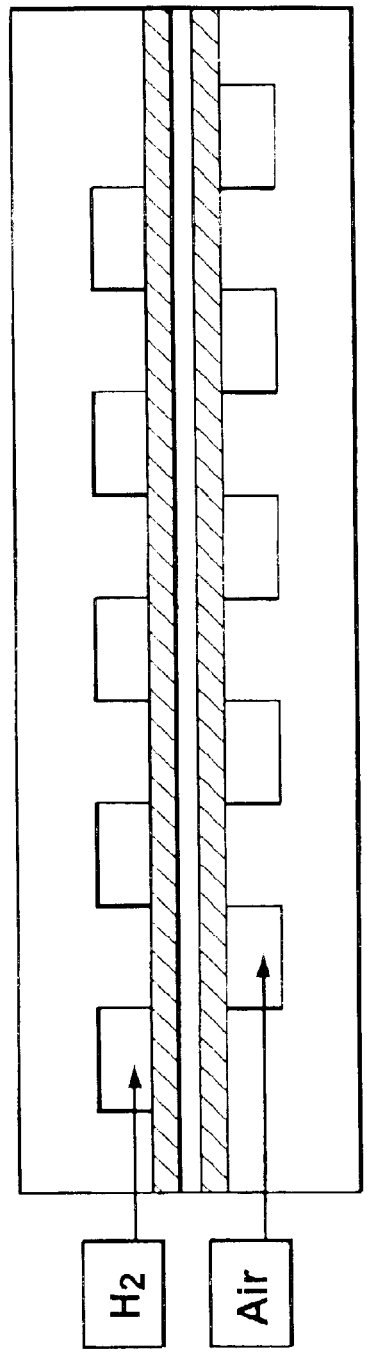
FIG. 4b shows a sectional view of a conventional fuel cell.

Now referring to FIGS. 4*a* and 4*b*, these show sectional views of a fuel cell of the present invention and a fuel cell of conventional design. Since the present invention employs substantially straight flow channels, it is possible to manufacture the anode and cathode flow field plates 120, 130 such that a substantial part of the ribs 173, 189 on the anode and cathode flow field plates 120, 130 are in alignment, i.e. the ribs 173 on the anode flow field plate 120 press against the ribs 189 on the cathode flow field plate 130 with the MEA 124 sandwiched in between. As shown in FIGS. 2*a* and 3*a*, in the present invention, the central portions of the anode and cathode flow field plates 120, 130 consist of substantially straight flow channels 172, 188 and ribs 173, 189, except for branching portions of the flow fields at the ends. Therefore, by adjusting the width of channels and ribs, the channel to rib ratio, or the number of channels that traverse the flow field plate, the ribs on both plates can be matched in these central portions.

Matching the ribs of anode and cathode flow field plates 120, 130 provides a number of advantages over the conventional non-matching design. Comparison experiments that respectively run a fuel cell stack employing conventional non-matching flow field plates and a fuel cell stack employing the flow field according to the present invention have shown that in conventional fuel cell stacks, the GDM and MEA are over compressed and overstretched due to shearing effects by the non-matching ribs. On the other hand, no damage to the GDM and the MEA was observed in the fuel cell stack employing the present flow field design. Furthermore, the fuel cell performance and efficiency are also improved.

Figure 5:
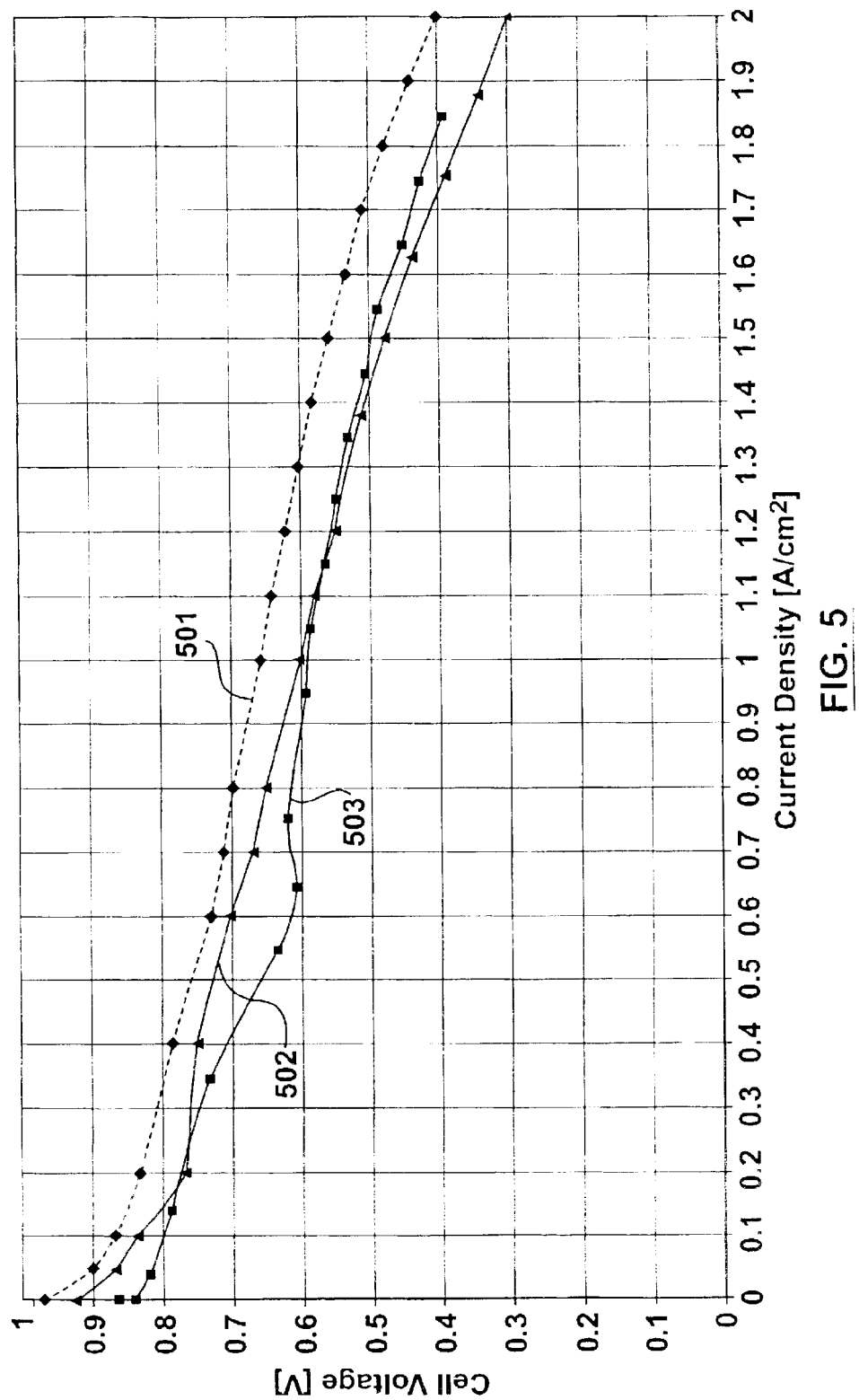
FIG. 5 shows a graph of polarization curve indicating the performance of the fuel cell according to the present invention.

FIG. 5 shows the comparison of the polarization curves of the two fuel cell stacks. The curves in this graph indicate the relation between cell voltage and current density. Curve 501 represents the polarization curve of the fuel cell according to the present invention, in which ribs on the anode and cathode flow field plates match each other at least in the central portions, as in FIG. 4*a*. All three fuel cell stacks have 100 cells in the stack. Curves 502 and 503 represent the performance of two fuel cell stacks in which different GDMs are used and ribs of the anode and cathode flow field plates do not match, i.e., in the central portions they were offset as in FIG. 4*b*. As can be seen, although the cell voltage decreases with increasing current density in all three cases, for any given current density, the cell voltage of the present fuel cell stack is higher than the other two stacks, which indicates a better performance.

In the present invention, the anode and cathode flow field plates 120 and 130 have the same pattern and the same channel to rib ratio. Preferably, the channel to rib ratio is 1.5:1. However, it is to be noted that a problem may arise when ribs on anode and cathode flow field plates 120 and 130 match each other, i.e., are directly opposed to one another. From the equation of the fuel cell reaction, it is to be understood that the stoichiometric ratio of hydrogen to oxygen is 1:2. In practical operation, both fuel and oxidant gases are supplied to the fuel cell stack in excess flow rate with respect to the reactants consumption rate, and hence the power output of a fuel cell stack, to ensure the fuel cell stack has sufficient reactants. This requires more oxidant gas flowing across the cathode flow field 142 than the amount of the fuel gas flowing across the anode flow field 132. Conventionally, this is usually achieved by enlarging the width of cathode flow channels to provide more active areas. In this embodiment, since the pattern of the flow field and the channel to rib ratio are the same on both flow field plates 120 and 130, this requirement can only be fulfilled by increasing the depth of the cathode flow channels to allow a sufficient amount of air to dissipate to the MEA 124 across GDM 126. The ratio of the channel depth on cathode and anode flow field plates 120 and 130 varies according to the actual fuel and oxidant used in the fuel cell reaction. When pure hydrogen and air comprising approximately 20% oxygen are used as reactant gases, the ratio of channel depth on the cathode and anode flow field plates 120 and 130 is preferably 2–3:1. More preferably, the ratio is 3:1. If the hydrogen is derived from reformate which means that only 40% of the fuel gas is pure hydrogen, the ratio is preferably 1.5–2:1.

The spirit of the invention relates to optimization of fuel cell flow field plates. It should be appreciated that the shape of the flow field plates and fuel cell stack of the present invention are not limited to those disclosed in the above description, e.g. they are not necessarily rectangular in shape, as disclosed herein. Moreover, materials chosen of the flow field plates, the MEA and the gas diffusion media are the subject of conventional fuel cell technology, and by themselves, do not form part of the present invention.

While the above description constitutes the preferred embodiments, it will be appreciated that the present invention is susceptible to modification and change without departing from the fair meaning of the proper scope of the accompanying claims. For example, the present invention might have applicability in other types of fuel cells that employ pure hydrogen as a fuel, which include but are not limited to, alkaline, molten-carbonate, and phosphoric acid. Additionally, the number and arrangement of the components in the system might be varied, but may still fall within the scope and spirit of the claims.

What is claimed is:

1. A fuel cell stack comprising a plurality of fuel cells, each fuel cell comprising an anode flow field plate, a cathode flow field plate and a membrane electrode assembly disposed between the anode and cathode flow field plates, wherein the anode flow field plate includes a plurality of anode primary channels and a plurality of ribs separating the anode primary channels, wherein the cathode flow field plate includes a plurality of cathode primary channels and a plurality of ribs separating the cathode primary channels, and wherein at least a portion of the anode primary channels and the cathode primary channels are disposed directly opposite one another with the membrane exchange assembly therebetween and with at least some of the ribs of the anode flow field plate matching the ribs on the cathode flow field plate and being located directly opposite one another to sandwich the membrane exchange assembly therebetween; and wherein, for each fuel cell, the anode flow field plate includes a plurality of fuel inlet distribution channels and fuel outlet collection channels, each of the fuel inlet distribution and outlet collection channels being connected to a plurality of the anode primary channels, and wherein, for each fuel cell, the cathode flow field plate includes a plurality of oxidant inlet distribution and oxidant outlet collection channels, each of the oxidant inlet distribution and oxidant outlet collection channels being connected to a plurality of the cathode primary channels.

2. A fuel cell stack as claimed in claim 1, wherein each of the anode and cathode flow field plates has the portion of matching channels provided generally centrally.

3. A fuel cell stack as claimed in claim 2, wherein each of the anode and cathode flow field plates includes a fuel inlet aperture aligned with other fuel inlet apertures to form a fuel inlet duct, an oxidant inlet aperture aligned with other oxidant inlet apertures to form an oxidant inlet duct, a coolant inlet aperture aligned with other coolant inlet apertures to form a coolant inlet duct, a fuel outlet aperture aligned with other fuel outlet apertures to form a fuel outlet duct, an oxidant outlet aperture aligned with other oxidant outlet apertures to form an oxidant outlet duct and a coolant outlet aperture aligned with other coolant outlet apertures to form a coolant outlet duct, and wherein, for each fuel cell, the anode flow field plate includes at least one fuel inlet distribution channel connecting the fuel inlet duct to the anode primary channels and at least one fuel outlet collection channel connecting the anode primary channels to the fuel outlet duct.

4. A fuel cell stack as claimed in claim 2, wherein each of the anode and cathode flow field plates includes a fuel inlet aperture aligned with other fuel inlet apertures to form a fuel inlet duct, an oxidant inlet aperture aligned with other oxidant inlet apertures to form an oxidant inlet duct, a coolant inlet aperture aligned with other coolant inlet apertures to form a coolant inlet duct, a fuel outlet aperture for the fuel aligned with other fuel outlet apertures to form a fuel outlet duct, an oxidant outlet aperture aligned with other oxidant outlet apertures to form an oxidant outlet duct and a coolant outlet aperture aligned with other coolant outlet apertures to form a coolant outlet duct, and wherein, for each fuel cell, the cathode flow field plate includes at least one oxidant inlet distribution channel connecting the oxidant inlet duct to the cathode primary channels and at least one oxidant outlet collection channel connecting the cathode primary channels to the oxidant outlet duct.

5. A fuel cell stack as claimed in claim 3, wherein, for each fuel cell, the cathode flow field plate includes at least one oxidant inlet distribution channel connecting the oxidant inlet duct to the cathode primary channels, and at least one oxidant outlet collection channel connecting the cathode primary channels to the oxidant outlet duct.

6. A fuel cell stack as claimed in claim 1 wherein, for each of the anode and cathode flow field plates, the fuel inlet and outlet apertures are provided at opposite ends of the plate and the oxidant inlet and outlet apertures are provided at opposite ends of the plate, wherein, for each anode flow field plate, the anode primary channels extend substantially parallel to one another in a direction from the fuel inlet aperture towards the fuel outlet aperture, wherein, for each cathode flow field plate, the cathode primary channels extend substantially parallel to one another in a direction from the oxidant inlet aperture to the oxidant outlet aperture, and wherein, for each anode flow field plate, the fuel inlet distribution and outlet collection channels extend substantially perpendicularly to the anode primary channels, and, for each cathode flow field plate, the oxidant inlet distribution channels and the oxidant outlet collection channels extend substantially perpendicularly to the cathode primary channels.

7. A fuel cell stack as claimed in claim 5, which includes, for at least one of the anode and cathode flow field plates, a provision for feeding reactant from the rear thereof to the front face including the primary channels, said provision including slots extending through the respective flow field plate.

8. A fuel cell stack as claimed in claim 7, which includes, for each fuel cell, a provision for feeding gas flow from the rear of each of the cathode and anode flow field plates to the front face thereof.

9. A fuel cell stack as claimed in claim 8, wherein said provision for feeding gas flow from the rear of each of the cathode and anode flow field plates to the front face thereof comprises, for each anode flow field plate, at least one inlet slot between the fuel inlet duct and each fuel inlet distribution channel and at least one outlet slot between each fuel outlet collection channel and the fuel outlet duct and, for each cathode flow field plate, at least one inlet slot between the oxidant inlet duct and each oxidant inlet distribution channel and at least one outlet slot between each oxidant outlet collection channel and the oxidant outlet duct.

10. A fuel cell stack as claimed in claim 9, wherein, for each fuel cell, the anode flow field plate includes said at least one inlet slot thereof adjacent the fuel inlet duct and said at least one outlet slot thereof adjacent the fuel outlet duct, and the cathode flow field plate includes said at least one inlet slot thereof adjacent the oxidant inlet duct and said at least one outlet slot thereof adjacent the oxidant outlet duct.

11. A fuel cell stack as claimed in claim 10, that includes on the rear of at least one of the anode and cathode flow field plates, a first aperture extension between the fuel inlet duct and said at least one fuel inlet slot of the anode flow field plates, a second aperture extension between the fuel outlet duct and said at least one outlet slot of the anode flow field plates, a third aperture extension between the oxidant inlet duct and said at least one inlet slot of the cathode flow field plates, and a fourth aperture extension between the oxidant outlet duct and said at least one outlet slot of the cathode flow field plates.

12. A fuel cell stack as claimed in claim 11, wherein, all of the aperture extensions are provided on one of the rear faces of the anode flow field plates and the rear faces of the cathode flow field plates, and wherein the other rear faces of the anode flow field plates and cathode flow field plates are substantially smooth.

13. A fuel cell stack as claimed in claim 12, wherein, for each fuel cell, said one of the anode and cathode flow field plates having all of the aperture extensions includes a plurality of coolant channels extending between the coolant inlet duct and the coolant outlet duct.

14. A fuel cell stack as claimed in claim 13, wherein the plurality of coolant channels comprises coolant inlet distribution channels extending from the coolant inlet duct, a plurality of coolant outlet collection channels connected to the coolant outlet duct and a plurality of primary coolant channels connected between the coolant inlet distribution and outlet collection channels, each coolant inlet distribution channel and each coolant outlet collection channel being connected to a plurality of primary coolant channels.

15. A fuel cell stack as claimed in claim 12, 13 or 14, wherein each rear face of the anode and cathode flow field plates including the aperture extensions includes, for each aperture extension, a seal enclosing each aperture extension, each slot associated therewith and the duct associated therewith, and the front faces of the anode and cathode flow field plates includes seals around each of the apertures and excluding the slots.

16. A fuel cell stack as claimed in claim 6, 7, 9 or 11, wherein the primary channels at least of each anode and cathode flow field plate have substantially the same dimensions.

17. A fuel cell stack as claimed in claim 16, wherein the anode and cathode flow field plates are identical, whereby only a single type of flow field plate is provided.

18. A fuel cell stack as claimed in claim 6, wherein the anode and cathode flow field plates have primary channels provided with different flow characteristics.

19. A fuel cell stack as claimed in claim 18, wherein the flow cross-sections of the primary channels of the anode flow field plate are different from the flow cross-sections of the primary channels of the cathode flow field plate.

20. A fuel cell stack as claimed in claim 1, wherein, for at least one of the anode flow field plates and the cathode flow field plates, the ratio of the width of the primary channels to the width of the ribs is 1.5:1.

21. A fuel cell stack as claimed in claim 1, wherein, the ratio of the depth of the cathode primary channels to the depth of the anode primary channels is in the range 1.5–3:1.

22. A fuel cell stack as claimed in claim 21, wherein the ratio of the depth of the cathode primary channels to the depth of the anode primary channels is in the range 2–3:1.

23. A fuel cell stack as claimed in claim 21, wherein the ratio of the depth of the cathode primary channels to the depth of the anode primary channels is in the range 1.5–2:1.

24. A fuel cell stack as claimed in claim 21, wherein the ratio of the depth of the cathode primary channels to the dept of the anode primary channels is 3:1.

25. A fuel cell stack as claimed in claim 6, wherein on the anode flow field plates, along the direction of the anode primary channels, each of the plurality of anode primary channels, relative to the corresponding fuel inlet distribution channel and the corresponding fuel outlet collection channel has one end thereof spaced at a distance from the said fuel inlet distribution channel, and the other end thereof spaced at the same distance from the said fuel outlet collection channel, and wherein the ratio of the distance to the width of the anode primary channels is in the range of 1.5–2:1.

26. A fuel cell stack as claimed in claim 25, wherein on the cathode flow field plates, along the direction of the cathode primary channels, each of the plurality of cathode primary channels, relative to the corresponding oxidant inlet distribution channel and the corresponding oxidant outlet collection channel has one end thereof spaced at a distance from the said oxidant inlet distribution channel, and the other end thereof spaced at the same distance from the said oxidant outlet collection channel, and wherein the ratio of the distance to the width of the cathode primary channels is in the range of 1.5–2:1.

27. A fuel cell stack as claimed in claim 4, wherein, for at least one of the anode flow field plates and cathode flow field plates, the inlet distribution channels and the outlet collection channels have a width 1–1.5 times the width of the corresponding primary channels.

28. A fuel cell stack as claimed in claim 4 or 27, wherein the inlet distribution channels and the outlet collection channels include fillets to reduce flow resistance.

* * * * *

UNITED STATES PATENT AND TRADEMARK OFFICE
CERTIFICATE OF CORRECTION

PATENT NO. : 6,878,477 B2
DATED : April 12, 2005
INVENTOR(S) : David Frank et al.

It is certified that error appears in the above-identified patent and that said Letters Patent is hereby corrected as shown below:

Column 19,
Line 11, replace "includes" with -- include --;
Line 31, replace "wherein," with -- wherein --; and Column 20,
Line 5, replace "dept" with -- depth --.

Signed and Sealed this

Fifth Day of July, 2005

JON W. DUDAS
*Director of the United States Patent and Trademark Office*